US011911732B2

(12) United States Patent
Harman, Jr. et al.

(10) Patent No.: US 11,911,732 B2
(45) Date of Patent: Feb. 27, 2024

(54) OILFIELD DEEP WELL PROCESSING AND INJECTION FACILITY AND METHODS

(71) Applicant: NuBlu Innovations, LLC, Center, TX (US)

(72) Inventors: Robert Meredith Harman, Jr., Sugar Grove, WV (US); Ravi Sudhakar Vemulapalli, Katy, TX (US)

(73) Assignee: NuBlu Innovations, LLC, Center, TX (US)

( * ) Notice: Subject to any disclaimer, the term of this patent is extended or adjusted under 35 U.S.C. 154(b) by 0 days.

(21) Appl. No.: 16/839,366

(22) Filed: Apr. 3, 2020

(65) Prior Publication Data

US 2021/0308637 A1    Oct. 7, 2021

(51) Int. Cl.
*B01F 23/47*    (2022.01)
*B01D 21/00*    (2006.01)
(Continued)

(52) U.S. Cl.
CPC .......... *B01F 23/47* (2022.01); *B01D 21/0012* (2013.01); *B01D 21/283* (2013.01);
(Continued)

(58) Field of Classification Search
CPC .... B01F 3/10; B01F 5/0602; B01F 15/00162; B01F 15/00246; B01F 15/00344; B01F 2003/105; B01F 2215/0052; B01D 21/0012; B01D 21/283; B01D 21/32; C02F 1/004; C02F 1/008; C02F 1/34; C02F 2103/10; C02F 2201/005; C02F 2209/03;
(Continued)

(56) References Cited

U.S. PATENT DOCUMENTS

| 398,068 A | 2/1889 | McEwan |
| 1,693,885 A | 12/1928 | Butterworth |

(Continued)

FOREIGN PATENT DOCUMENTS

| CA | 2366079 | 6/2003 |
| CA | 2594500 A1 | 8/2006 |

(Continued)

OTHER PUBLICATIONS (Harman, Robert et al.) Co-Pending U.S. Appl. No. 14/796,006, filed Jul. 10, 2015, Specification, Claims, Figures.

(Continued)

*Primary Examiner* — Bradley R Spies
*Assistant Examiner* — Jeannie McDermott
(74) *Attorney, Agent, or Firm* — New River Valley IP Law, P.C.; Michele L. Mayberry; Ashley M. Gates

(57) ABSTRACT

Systems and methods for processing one or more waste fluids by measuring one or more properties of a waste fluid and adjusting the flow and/or flowability of the waste fluid based on the measurement are disclosed. The one or more properties of the waste fluid can include a viscosity of the waste fluid, a pressure of the waste fluid, and/or or a difference in pressure of the waste fluid. Adjusting the flow and/or flowability of the waste fluid can include adjusting the one or more properties of the waste fluid and/or affecting the direction of flow of the waste fluid in a manner which changes the destination of the waste fluid.

19 Claims, 2 Drawing Sheets

(51) Int. Cl.
  *B01D 21/28* (2006.01)
  *B01D 21/32* (2006.01)
  *C02F 1/00* (2023.01)
  *C02F 1/34* (2023.01)
  *B01F 25/42* (2022.01)
  *B01F 35/21* (2022.01)
  *B01F 35/221* (2022.01)
  *E21B 21/06* (2006.01)
  *E21B 41/00* (2006.01)
  *E21B 49/08* (2006.01)
  *C02F 103/10* (2006.01)
  *B01F 101/00* (2022.01)

(52) U.S. Cl.
  CPC .............. *B01D 21/32* (2013.01); *B01F 25/42* (2022.01); *B01F 35/2113* (2022.01); *B01F 35/2136* (2022.01); *B01F 35/2211* (2022.01); *C02F 1/004* (2013.01); *C02F 1/008* (2013.01); *C02F 1/34* (2013.01); *E21B 21/066* (2013.01); *E21B 41/0057* (2013.01); *E21B 49/08* (2013.01); *B01F 23/471* (2022.01); *B01F 2101/305* (2022.01); *C02F 2103/10* (2013.01); *C02F 2201/005* (2013.01); *C02F 2209/03* (2013.01); *C02F 2209/09* (2013.01); *C02F 2209/40* (2013.01)

(58) Field of Classification Search
  CPC .............. C02F 2209/09; C02F 2209/40; E21B 41/005; E21B 21/065; E21B 21/08; G01N 11/02; G01N 2011/0026
  See application file for complete search history.

(56) References Cited

U.S. PATENT DOCUMENTS

| | | |
|---|---|---|
| 1,838,634 A | 12/1931 | Peterson et al. |
| 1,857,766 A | 5/1932 | Peterson |
| 2,116,935 A | 5/1938 | Richard et al. |
| 2,375,513 A | 5/1945 | Bach |
| 2,845,091 A | 7/1958 | Neer |
| 2,845,934 A | 8/1958 | Richard |
| 2,858,836 A | 11/1958 | Geh et al. |
| 2,964,512 A | 12/1960 | Goins |
| 3,002,468 A | 10/1961 | Williams |
| 3,022,792 A | 2/1962 | Perkins |
| 3,046,163 A | 7/1962 | Kearney et al. |
| 3,104,672 A | 9/1963 | Holdren |
| 3,394,761 A | 7/1968 | Jackson, Jr. et al. |
| 3,420,444 A | 1/1969 | Gunnar |
| 3,556,407 A | 1/1971 | Hiroshi et al. |
| 3,599,871 A | 8/1971 | Ruppel et al. |
| 3,645,452 A | 2/1972 | Stoeckel et al. |
| 3,741,808 A | 6/1973 | Stalker |
| 3,746,023 A | 7/1973 | Smith |
| 3,837,399 A | 9/1974 | Allen et al. |
| 3,856,334 A | 12/1974 | Lange |
| 4,106,950 A | 8/1978 | Grismer |
| 4,144,901 A | 3/1979 | Stevenson |
| 4,207,965 A | 6/1980 | Chiang-Cheng et al. |
| 4,220,170 A | 9/1980 | Hebert et al. |
| 4,232,738 A | 11/1980 | Yen et al. |
| 4,244,523 A | 1/1981 | Looper |
| 4,351,478 A | 9/1982 | Looper |
| 4,413,785 A | 11/1983 | Engelbert et al. |
| 4,453,864 A | 6/1984 | Beck et al. |
| 4,557,636 A | 12/1985 | Beck et al. |
| 4,574,825 A | 3/1986 | Haug |
| 4,604,037 A | 8/1986 | Hoya |
| 4,660,678 A | 4/1987 | Krag |
| 4,668,358 A | 5/1987 | Ball |
| 4,672,710 A | 6/1987 | Urbani |
| 4,725,362 A | 2/1988 | Dugat |
| 4,751,887 A | 6/1988 | Terry et al. |
| 4,753,268 A | 6/1988 | Palau |
| 4,890,673 A | 1/1990 | Payne |
| 4,941,493 A | 7/1990 | Wieringa |
| 4,942,929 A | 7/1990 | Malachosky et al. |
| 4,957,188 A | 9/1990 | Bavis |
| 4,994,169 A | 2/1991 | Godino et al. |
| 5,033,490 A | 7/1991 | Wade et al. |
| 5,048,775 A | 9/1991 | Hungerford |
| 5,058,612 A | 10/1991 | Winsted |
| 5,096,047 A | 3/1992 | Morikiyo et al. |
| 5,107,879 A | 4/1992 | Harvey |
| 5,109,933 A | 5/1992 | Jackson |
| 5,129,469 A | 7/1992 | Jackson |
| 5,195,548 A | 3/1993 | Roger |
| 5,226,749 A | 7/1993 | Perkins |
| 5,303,786 A | 4/1994 | Prestridge et al. |
| 5,306,351 A | 4/1994 | Anderson |
| 5,310,285 A | 5/1994 | Northcott |
| 5,336,052 A | 8/1994 | Zollner et al. |
| 5,337,966 A | 8/1994 | Francis et al. |
| 5,344,570 A | 9/1994 | McLachlan et al. |
| 5,352,298 A | 10/1994 | Moulder |
| 5,361,998 A | 11/1994 | Sirevag et al. |
| 5,402,857 A | 4/1995 | Dietzen |
| 5,405,223 A | 4/1995 | Sirevag |
| 5,419,496 A | 5/1995 | Novak |
| 5,421,903 A | 6/1995 | Manabe et al. |
| 5,426,137 A * | 6/1995 | Allen .................... B01F 3/1271 366/158.4 |
| 5,431,236 A | 7/1995 | Warren |
| 5,454,662 A | 10/1995 | Skibitzke et al. |
| 5,518,553 A | 5/1996 | Moulder |
| 5,526,562 A | 6/1996 | Kita et al. |
| 5,544,669 A | 8/1996 | Manabe et al. |
| 5,564,509 A | 10/1996 | Dietzen |
| 5,589,603 A | 12/1996 | Alexander et al. |
| 5,638,845 A | 6/1997 | Oliver et al. |
| 5,685,411 A | 11/1997 | Zimmerman et al. |
| 5,718,382 A | 2/1998 | Jaeger |
| 5,720,310 A | 2/1998 | Moulder |
| 5,734,988 A | 3/1998 | Alexander et al. |
| 5,740,821 A | 4/1998 | Arnold |
| 5,839,521 A | 11/1998 | Dietzen |
| 5,896,871 A | 4/1999 | Larsen |
| 5,961,438 A | 10/1999 | Ballantine et al. |
| 5,964,304 A | 10/1999 | Morrison et al. |
| 6,009,959 A | 1/2000 | Dietzen |
| 6,021,793 A | 2/2000 | Moulder |
| 6,105,390 A | 8/2000 | Bingham et al. |
| 6,106,733 A | 8/2000 | Wood |
| 6,119,779 A | 9/2000 | Gipson et al. |
| 6,179,070 B1 | 1/2001 | Dietzen |
| 6,179,071 B1 | 1/2001 | Dietzen |
| 6,189,613 B1 | 2/2001 | Chachula et al. |
| 6,192,905 B1 | 2/2001 | Mincy et al. |
| 6,213,134 B1 | 4/2001 | Pike |
| 6,213,135 B1 | 4/2001 | Moulder |
| 6,213,227 B1 | 4/2001 | Dietzen |
| 6,321,754 B1 | 11/2001 | Manabe et al. |
| 6,321,860 B1 | 11/2001 | Reddoch |
| 6,345,672 B1 | 2/2002 | Dietzen |
| 6,378,791 B1 | 4/2002 | Perry et al. |
| 6,425,263 B1 | 7/2002 | Bingham et al. |
| 6,435,565 B2 | 8/2002 | Potts et al. |
| 6,488,314 B1 | 12/2002 | Hutter |
| 6,491,173 B1 | 12/2002 | Costa |
| 6,553,901 B2 | 4/2003 | Reddoch |
| 6,581,409 B2 | 6/2003 | Wilding et al. |
| 6,585,115 B1 | 7/2003 | Reddoch et al. |
| 6,886,362 B2 | 5/2005 | Wilding et al. |
| 6,910,411 B2 | 6/2005 | Reddoch |
| 6,939,218 B1 | 9/2005 | Holland |
| 6,953,097 B2 | 10/2005 | Seyffert |
| 6,962,061 B2 | 11/2005 | Wilding et al. |
| 6,988,677 B2 | 1/2006 | Sodemann et al. |
| 6,994,464 B2 | 2/2006 | Villwock et al. |
| 7,089,949 B1 | 8/2006 | Rogerson et al. |
| 7,104,220 B1 | 9/2006 | Mack et al. |

(56) References Cited

U.S. PATENT DOCUMENTS

| | | |
|---|---|---|
| 7,108,143 B1 | 9/2006 | Lin |
| 7,219,512 B1 | 5/2007 | Wilding et al. |
| 7,261,109 B2 | 8/2007 | Luke et al. |
| 7,325,629 B2 | 2/2008 | Blaschke et al. |
| 7,455,066 B2 | 11/2008 | Feddema et al. |
| 7,523,570 B2 | 4/2009 | Pobihushchy |
| 7,575,072 B2 | 8/2009 | Reddoch |
| 7,591,150 B2 | 9/2009 | Turner et al. |
| 7,594,414 B2 | 9/2009 | Wilding et al. |
| 7,637,122 B2 | 12/2009 | Turner et al. |
| 7,717,474 B2 | 5/2010 | Gray |
| 7,798,218 B2 | 9/2010 | Garstad et al. |
| 7,857,077 B2 | 12/2010 | Reddoch |
| 7,905,683 B2 | 3/2011 | Kearney |
| 8,061,413 B2 | 11/2011 | Turner et al. |
| 8,133,164 B2 | 3/2012 | Beebe et al. |
| 8,133,328 B2 | 3/2012 | Delaney et al. |
| 8,137,030 B2 | 3/2012 | Kearney |
| 8,316,557 B2 | 11/2012 | Burnett |
| 8,316,963 B2 | 11/2012 | Eia et al. |
| 8,398,034 B2 | 3/2013 | Lambert et al. |
| 8,424,784 B1 | 4/2013 | Munisteri |
| 8,464,971 B1 | 6/2013 | Munisteri |
| 8,470,139 B2 | 6/2013 | Booth |
| 8,533,974 B2 | 9/2013 | Burnett |
| 8,544,295 B2 | 10/2013 | Turner et al. |
| 8,555,672 B2 | 10/2013 | Turner et al. |
| 8,584,749 B2 | 11/2013 | Troshko et al. |
| 8,607,894 B2 | 12/2013 | McDonald et al. |
| 8,757,320 B2 | 6/2014 | Liao |
| 8,899,074 B2 | 12/2014 | Wilding et al. |
| 9,204,774 B1 | 12/2015 | Jackson |
| 9,217,603 B2 | 12/2015 | Turner et al. |
| 9,254,448 B2 | 2/2016 | Turner et al. |
| 9,440,239 B1 | 9/2016 | Horton et al. |
| 9,574,713 B2 | 2/2017 | Turner et al. |
| 9,938,784 B2* | 4/2018 | Song ................... E21B 21/06 |
| 10,589,287 B2 | 3/2020 | Harman et al. |
| 10,788,259 B1 | 9/2020 | Tomlinson et al. |
| 11,008,821 B1 | 5/2021 | Steger et al. |
| 2002/0134554 A1 | 9/2002 | Schrenkel et al. |
| 2003/0135083 A1 | 7/2003 | Bruno et al. |
| 2003/0165390 A1 | 9/2003 | Jahn et al. |
| 2003/0192439 A1 | 10/2003 | Reddoch |
| 2003/0223850 A1 | 12/2003 | Hendriks et al. |
| 2005/0077299 A1 | 4/2005 | Cheng et al. |
| 2005/0199269 A1 | 9/2005 | Heil et al. |
| 2005/0229954 A1 | 10/2005 | Rosselott et al. |
| 2006/0016760 A1 | 1/2006 | Bozak et al. |
| 2006/0065292 A1 | 3/2006 | Moore |
| 2007/0107465 A1 | 5/2007 | Turner et al. |
| 2007/0120665 A1 | 5/2007 | Martin et al. |
| 2007/0215346 A1* | 9/2007 | Sloan ................... B01D 29/54 166/250.01 |
| 2008/0013401 A1* | 1/2008 | Tarmann ............... B01F 25/433 366/181.5 |
| 2008/0083566 A1 | 4/2008 | Burnett |
| 2008/0129039 A1 | 6/2008 | Gray |
| 2008/0165612 A1* | 7/2008 | Dykstra ............... B01F 35/2202 366/8 |
| 2008/0283295 A1 | 11/2008 | Eia |
| 2008/0283301 A1* | 11/2008 | Sherwood ............... E21B 21/01 175/206 |
| 2009/0078647 A1 | 3/2009 | Frazier et al. |
| 2009/0087319 A1 | 4/2009 | Russold et al. |
| 2009/0145167 A1 | 6/2009 | Turner et al. |
| 2009/0194280 A1 | 8/2009 | Gil et al. |
| 2010/0025497 A1 | 2/2010 | Ellenbecker |
| 2010/0040439 A1 | 2/2010 | Temple et al. |
| 2010/0051263 A1 | 3/2010 | Daniel et al. |
| 2010/0129155 A1 | 5/2010 | Kearney |
| 2010/0154828 A1 | 6/2010 | Green |
| 2010/0186446 A1 | 7/2010 | Turner et al. |
| 2010/0236580 A1 | 9/2010 | Delaurentiis |
| 2010/0288708 A1 | 11/2010 | Sloan et al. |
| 2010/0301147 A1 | 12/2010 | Harkess et al. |
| 2011/0005832 A1* | 1/2011 | McDonald ............ E21B 21/065 175/5 |
| 2011/0047743 A1 | 3/2011 | Shepherd |
| 2011/0094261 A1 | 4/2011 | Wilding et al. |
| 2011/0094262 A1 | 4/2011 | Turner et al. |
| 2011/0094263 A1 | 4/2011 | Wilding et al. |
| 2011/0114138 A1 | 5/2011 | Bastuji et al. |
| 2011/0246162 A1 | 10/2011 | Brown et al. |
| 2011/0284031 A1 | 11/2011 | Green |
| 2012/0000495 A1 | 1/2012 | Schmit et al. |
| 2012/0103012 A1 | 5/2012 | Turner et al. |
| 2012/0103428 A1 | 5/2012 | Turner et al. |
| 2012/0103561 A1 | 5/2012 | Turner et al. |
| 2012/0186491 A1 | 7/2012 | Cuypers et al. |
| 2012/0260945 A1 | 10/2012 | Kim et al. |
| 2013/0048575 A1 | 2/2013 | Gruber et al. |
| 2013/0057132 A1 | 3/2013 | Flowers et al. |
| 2013/0067762 A1 | 3/2013 | Burnett |
| 2013/0160989 A1 | 6/2013 | Durden |
| 2013/0213674 A1 | 8/2013 | Williams et al. |
| 2013/0213893 A1 | 8/2013 | Posa |
| 2013/0247939 A1 | 9/2013 | Chanthavongsy et al. |
| 2013/0263624 A1 | 10/2013 | Vandor |
| 2013/0340475 A1 | 12/2013 | Turner et al. |
| 2014/0083132 A1 | 3/2014 | Maunder et al. |
| 2014/0190517 A1 | 7/2014 | Fallon et al. |
| 2015/0192115 A1 | 7/2015 | Seith et al. |
| 2016/0290334 A1 | 10/2016 | Overend et al. |
| 2016/0331518 A1 | 11/2016 | Cable Ii et al. |
| 2017/0009557 A1* | 1/2017 | Harman ............... E21B 41/0057 |
| 2017/0152728 A1* | 6/2017 | Abou-Sayed ....... E21B 41/0092 |
| 2017/0254177 A1 | 9/2017 | Woodford et al. |
| 2017/0274333 A1* | 9/2017 | Smith ............... B01F 15/00389 |
| 2017/0335660 A1 | 11/2017 | Blackwell et al. |
| 2018/0028946 A1 | 2/2018 | Tabata et al. |
| 2018/0038639 A1 | 2/2018 | Farges et al. |
| 2018/0058992 A1* | 3/2018 | van Oort ................. G01N 11/02 |
| 2018/0128251 A1 | 5/2018 | Smith et al. |
| 2018/0209728 A1 | 7/2018 | Iurisci et al. |
| 2020/0370988 A1 | 11/2020 | Rogers et al. |
| 2021/0040803 A1* | 2/2021 | Collins ................. E21B 21/106 |
| 2021/0088273 A1 | 3/2021 | Harman, Jr. et al. |
| 2021/0180615 A1 | 6/2021 | Hove |
| 2021/0310334 A1 | 10/2021 | Harman, Jr. et al. |
| 2022/0088552 A1* | 3/2022 | McConville ........ B01F 35/2111 |
| 2022/0112789 A1 | 4/2022 | Harman, Jr. et al. |
| 2022/0136489 A1 | 5/2022 | Fisher et al. |
| 2022/0252340 A1 | 8/2022 | Vemulapalli et al. |
| 2023/0366619 A1 | 11/2023 | Vemulapalli et al. |

FOREIGN PATENT DOCUMENTS

| | | |
|---|---|---|
| CA | 2937235 C | 6/2018 |
| CN | 2350522 | 11/1999 |
| CN | 201125043 | 10/2008 |
| CN | 201711322 U | 1/2011 |
| CN | 201728211 U | 2/2011 |
| CN | 202162184 U | 3/2012 |
| CN | 202199558 U | 4/2012 |
| CN | 105233744 A * | 1/2016 |
| EP | 0041855 A1 | 12/1981 |
| EP | 1437184 B1 | 8/2012 |
| EP | 1686883 B1 | 11/2012 |
| EP | 2512958 B1 | 5/2013 |
| FR | 3022901 B1 | 7/2016 |
| JP | 2019210861 A | 12/2019 |
| KR | 20040037631 A | 5/2004 |
| KR | 20160143035 A | 12/2016 |
| KR | 20170001334 A | 1/2017 |
| WO | 1991016150 A1 | 10/1991 |
| WO | 1993018864 A1 | 9/1993 |
| WO | 1994017922 A1 | 8/1994 |
| WO | 1995014543 A1 | 6/1995 |
| WO | 1995022415 A1 | 8/1995 |
| WO | 1997000142 A1 | 1/1997 |
| WO | 1998016717 A1 | 4/1998 |
| WO | 1999004134 A1 | 1/1999 |
| WO | 2002005682 A2 | 1/2002 |

(56) References Cited

FOREIGN PATENT DOCUMENTS

| WO | 2002044515 A1 | 6/2002 |
| WO | 2003059540 A1 | 7/2003 |
| WO | 2008041020 A1 | 4/2008 |
| WO | 2008113070 A2 | 9/2008 |
| WO | 2010143060 A1 | 12/2010 |
| WO | 2012005889 A1 | 1/2012 |
| WO | 2012082216 A1 | 6/2012 |
| WO | 2013048252 A2 | 4/2013 |
| WO | 2014023476 A1 | 2/2014 |

OTHER PUBLICATIONS (Harman, Robert et al.) Co-Pending U.S. Appl. No. 14/796,043, filed Jul. 10, 2015, Specification, Claims, Figures.

(Harman, Robert et al.) Co-pending U.S. Appl. No. 14/796,073, filed Jul. 10, 2015, Specification, Claims, Figures.

(Harman, Robert et al.) Co-Pending U.S. Appl. No. 15/214,550, filed Jul. 20, 2016, Specification, Claims, Figures.

(Harman, Robert et al.) Co-pending U.S. Appl. No. 16/580,571, filed Sep. 24, 2019, Specification, Claims, and Figures.

(Harman, Robert et al.) Co-pending U.S. Appl. No. 16/839,390, filed Apr. 3, 2020, Specification, Claims, and Figures.

(Harman, Robert et al.) Co-pending U.S. Appl. No. 17/518,694, filed Nov. 4, 2021, Specification, Claims, and Figures.

Co-pending U.S. Appl. No. 16/580,571 Restriction Requirement dated Dec. 17, 2021, 8 pages.

(Vemulapalli, Ravi et al.) Co-Pending U.S. Appl. No. 17/168,427, filed Feb. 5, 2021, Specification, Claims, and Figures.

Co-pending U.S. Appl. No. 16/580,571 Non-Final Office Action dated Aug. 12, 2022, 14 pages.

Co-pending U.S. Appl. No. 16/580,571 Response to Dec. 17, 2021 Restriction Requirement, dated Jun. 17, 2022, 12 pages.

Co-pending U.S. Appl. No. 16/839,390, Non-Final Office Action dated Jul. 29, 2022, 19 pages.

Co-Pending U.S. Appl. No. 17/168,427, Restriction Requirement dated Aug. 26, 2022, 9 pages.

Co-pending U.S. Appl. No. 17/518,694, Non-Final Office Action dated Sep. 8, 2022, 14 pages.

Neff, Jerry Michael and Randi Elisabet Hagemann. "Environmental challenges of heavy crude oils: Management of liquid wastes" E&P Environmental and Safety Conference, OnePetro, 2007, 10 pages.

(Vemulapalli, Ravi et al.) Co-Pending U.S. Appl. No. 18/315,233, filed May 10, 2023, Specification, Claims, and Figures.

Co-pending U.S. Appl. No. 16/580,571 Notice of Non-Compliant Amendment dated Mar. 3, 2023, 3 pages.

Co-pending U.S. Appl. No. 16/580,571 Response to Aug. 12, 2022 Non-Final Office Action, dated Feb. 13, 2023, 14 pages.

Co-pending U.S. Appl. No. 16/580,571 Response to Mar. 3, 2023 Notice of Non-Compliant Amendment, dated Mar. 14, 2023, 6 pages.

Co-pending U.S. Appl. No. 16/839,390, Final Office Action dated Apr. 19, 2023, 20 pages.

Co-pending U.S. Appl. No. 16/839,390, Response to Jul. 29, 2022 Non-Final Office Action, dated Jan. 30, 2023, 8 pages.

Co-Pending U.S. Appl. No. 17/168,427, Non-Final Office Action dated Jan. 9, 2023, 10 pages.

Co-Pending U.S. Appl. No. 17/168,427, Response to Aug. 26, 2022 Restriction Requirement, dated Nov. 28, 2022, 2 pages.

(Vemulapalli, Ravi et al.) Co-Pending U.S. Appl. No. 18/493,626 filed Oct. 24, 2023, Specification, Claims, and Figures.

Co-pending U.S. Appl. No. 16/839,390, Non-Final Office Action dated Nov. 20, 2023, 19 pages.

Co-pending U.S. Appl. No. 16/839,390, Response to Apr. 19, 2023 Final Office Action, dated Oct. 19, 2023, 9 pages.

Co-pending U.S. Appl. No. 16/580,571 Final Office Action dated Jun. 28, 2023, 12 pages.

Co-Pending U.S. Appl. No. 17/168,427, Notice Regarding Non-Compliant or Non-Responsive Amendment dated Aug. 24, 2023, 5 pages.

Co-Pending U.S. Appl. No. 17/168,427, Response to Jan. 9, 2023 Non-Final Office Action, dated Jul. 10, 2023, 10 pages.

* cited by examiner

OILFIELD DEEP WELL PROCESSING AND INJECTION FACILITY AND METHODS

BACKGROUND OF THE INVENTION

Field of the Invention

The present invention is directed to the field of waste fluid processing. More particularly, embodiments of the invention are directed to systems and methods which handle waste fluids from oil fields by measuring one or more properties of the waste fluids and adjusting the flow and/or flowability of the waste fluids based on the measurement.

Description of Related Art

Oil field liquid waste facilities receive produced water, drilling muds, tank sludges, frac fluids and all other liquid wastes generated during the drilling and production of hydrocarbons. In every application to date, large, costly positive displacement piston pumps are used for injection of liquid wastes, with solids content greater than a few hundred parts per million, from oil fields because fluid viscosities are not controlled to protect the pump and or the injection well. Also, such facilities typically segregate the fluids and have dedicated unload systems for clean fluids and viscous fluids typically laden with solids, which could be drill cuttings, frac sand, clays, and so on. The segregated systems use dedicated unload hoses and unload pumps for each type of fluid, thus increasing the cost of processing the waste streams. Thus, there is a need for more efficient and cost-effective systems for handling oil field wastes.

SUMMARY OF THE INVENTION

Embodiments of the invention provide systems and methods for processing one or more waste fluids by measuring one or more properties of a waste fluid and adjusting the flow and/or flowability of the waste fluid based on the measurement(s). The one or more properties of the waste fluid can include a viscosity of the waste fluid and/or a pressure of the waste fluid and/or a difference in pressure of the waste fluid between two measurements of the waste fluid, such as along one or more conduit transporting the waste fluid, before and/or after screening of the waste fluid, or over time. In some embodiments, the one or more properties of the waste fluid are compared to a predetermined value. Adjusting the flow and/or flowability of the waste fluid can include adjusting the one or more properties of the waste fluid and/or affecting the direction of flow of the waste fluid in a manner which changes the destination of the waste fluid.

BRIEF DESCRIPTION OF THE DRAWINGS

The accompanying drawings illustrate certain aspects of embodiments of the present invention, and should not be used to limit the invention. Together with the written description the drawings serve to explain certain principles of the invention.

DETAILED DESCRIPTION OF VARIOUS EMBODIMENTS OF THE INVENTION

Figure 1:
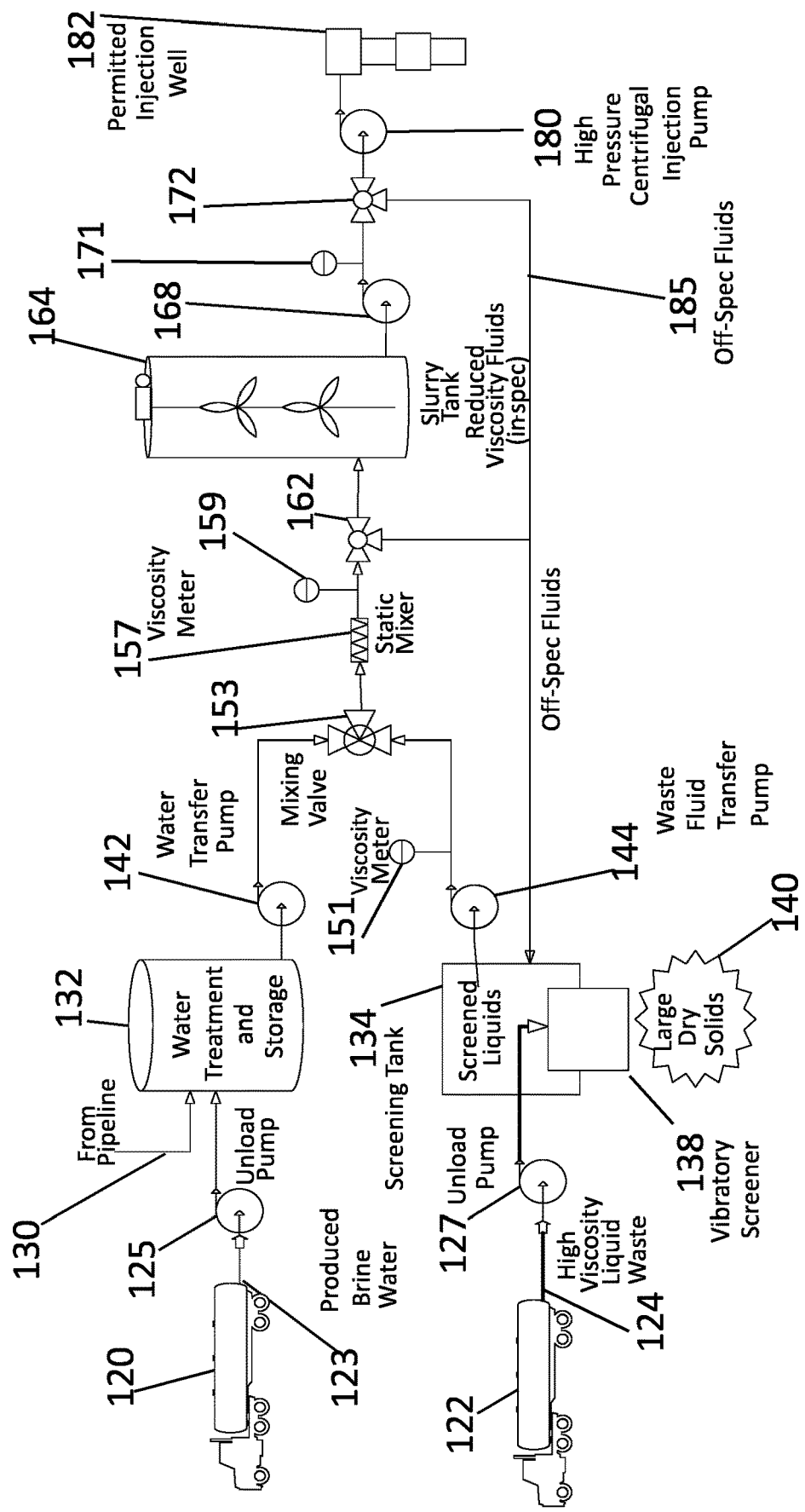
FIG. 1 is a schematic drawing depicting a system and process for viscosity conditioning of waste fluids from oil fields according to an embodiment.

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

As used herein, "high viscosity" fluids include water- or oil-based drilling muds, produced fluids, fracking fluids, crude storage tank sludge, each typically having a viscosity of at least 5 centipoise, including 10 centipoise, 15 centipoise, 20 centipoise, 25 centipoise, centipoise, 100 centipoise, 200 centipoise, 500 centipoise, 1000 centipoise, 5,000 centipoise, centipoise, or higher, or any range of viscosity within any of these parameters as endpoints. Lower viscosity fluids such as water and brine typically have a viscosity of less than 5 centipoise, such as 1 centipoise.

The embodiments described below provide systems and methods for adjusting one or more properties of a waste fluid by reducing a viscosity of the waste fluid. The viscosity of the waste fluid is reduced by mixing or diluting the waste fluid with a fluid having a viscosity that is lower than the waste fluid.

According to embodiments, a system and method for processing oil and gas drilling wastes within an oil field deep well processing and injection facility are provided. One embodiment provides a method which includes receiving a first waste fluid with a first viscosity, receiving a second waste fluid with a second viscosity that is higher than the first viscosity, measuring the viscosity of the second waste fluid, and adjusting the viscosity by mixing the first waste fluid with the second waste fluid in a manner which provides a mixed waste fluid having a viscosity which is between the first and second viscosities. A ratio of the first waste fluid and second waste fluid in the mixed waste fluid is determined by the measured viscosity of the second waste fluid.

The method can include screening the second waste fluid for solids of a predetermined size prior to the measuring and/or the mixing. The method can also include measuring a viscosity of the mixed waste fluid, and if the viscosity of the mixed waste fluid exceeds a predetermined value, then the mixed waste fluid is screened for solids of a predetermined size. If the viscosity of the mixed waste fluid is equal or lower than the predetermined value, then the mixed waste fluid is transferred to a slurry tank capable of keeping solids in the mixed waste fluid in suspension.

The method can further include transferring the mixed waste fluid from the slurry tank and measuring the viscosity of the mixed waste fluid after exit from the slurry tank, and if the viscosity of the mixed waste fluid exceeds a predetermined value, then the mixed waste fluid is screened for solids of a predetermined size. If the viscosity of the mixed waste fluid is equal or lower than the predetermined value, then the mixed waste fluid is transferred to a pump having a motive force capable of injecting the mixed waste fluid into a disposal well.

A method for processing one or more waste fluids is included, which comprises: measuring one or more properties of a waste fluid; comparing the one or more properties to a predetermined value; and based on the comparing, affecting the direction of flow of the waste fluid in a manner which changes the destination of the waste fluid. The one or more properties of the waste fluid can comprise: a viscosity of the waste fluid; a pressure of the waste fluid; and/or a difference in pressure between two pressure measurements of the waste fluid. In embodiments, if the viscosity, pressure, and/or difference in pressure exceed the predetermined value, then the waste fluid can be transferred to a first treatment system; and if the viscosity, pressure, and/or difference in pressure are equal or lower than the predetermined value, then the waste fluid can be transferred to a second treatment system. In embodiments, the first treatment system can be a slurry treatment system and the second treatment system can be an oil and/or water treatment system.

Such methods can further comprise screening the waste fluid for particulate matter during and/or prior to transfer of the waste fluid to the oil and/or water treatment system, and/or measuring a pressure differential between before and/or after the screening of waste fluids, and/or comparing the pressure differential with a predetermined value. In embodiments, if the pressure differential exceeds the predetermined value, then all or a portion of the waste fluid can be transferred to the slurry treatment system.

Methods of the invention also include methods for processing one or more waste fluids, comprising: pumping a waste fluid with a first pump; measuring a first pressure before the waste fluid is received at the first pump; measuring a second pressure after the waste fluid is outputted by the first pump; applying a motive force to the waste fluid with a second pump based on the measuring. In embodiments, applying the motive force can comprise activating the second pump when: the first pressure increases; the second pressure decreases; and/or the first pressure exceeds the second pressure. Still further, in embodiments, applying the motive force can comprise applying a vacuum with the second pump; and/or pumping the waste fluid with the first pump comprises controlling a speed of the first pump with a variable frequency drive based on the first pressure and/or second pressure.

Another embodiment provides a system for processing one or more waste fluids. The system includes a first input capable of receiving a first waste fluid having a first viscosity, a second input capable of receiving a second waste fluid having a second viscosity that is higher than the first viscosity, one or more sensor capable of measuring one or more properties of the second waste fluid, and one or more mixing device capable of mixing the first waste fluid and the second waste fluid to provide a mixed waste fluid at a ratio determined by the measured property or properties of the second waste fluid. The one or more properties of the second waste fluid can include a viscosity of the waste fluid and/or a pressure of the waste fluid and/or a difference in pressure of the waste fluid such as along one or more conduit transporting the waste fluid, or before and/or after passing the waste fluid through a screen, or from one time point to another. The one or more mixing device can include a mixing valve, a static mixer, or a combination thereof.

The system can include a first storage tank capable of storing the first waste fluid and a second storage tank capable of storing the second waste fluid. The second storage tank can include a screener capable of screening solids of a predetermined size from the second waste fluid.

The system can include a slurry tank capable of storing the mixed waste fluid and keeping solids in the mixed waste fluid in suspension, one or more sensor capable of measuring one or more properties of the mixed waste fluid entering and/or exiting the slurry tank, and one or more valve capable of transferring the mixed waste fluid to the second storage tank based on the measured property or properties of the mixed waste fluid.

The system can include a pump positioned to receive the mixed waste fluid. The pump has a motive force capable of injecting the mixed waste fluid into a disposal well.

The system is configured to control the viscosity of the waste fluids, and as a result allows for the use of multi-stage centrifugal pumps for deep well injection instead of large, costly positive displacement injection pumps that are required for high viscosity fluids. The system optimizes the fluid viscosities in real time to match the pumps specification for optimal injection volumes, such as at or below 5 or 10 centipoise, such as 1 to 5 centipoise.

According to embodiments, the first waste fluid is clean brine water, produced during the extraction of hydrocarbons, which is mixed with the higher viscosity second waste fluids to optimize the viscosity after the two fluids are mixed. The brine water is brought in by truck or pipeline, to mix with high viscosity waste fluids to control the viscosity of the mixed waste fluid. Viscosity determinations are made by one or more viscosity meters, which preset the ratio of clean brine water to waste fluids, measure for off-spec conditions after mixing, and/or monitor fluids going to the injection pumps to project the pumps. A vibratory screener is used prior to any viscosity measurements to remove large solid particles.

An embodiment of such system is shown in FIG. 1. For FIGS. 1 and 2, it will be understood that the lines and arrows shown in the figures can be implemented through metal piping or pipelines used for transferring oil and gas drilling fluids such as black steel, galvanized steel, copper, brass or corrugated stainless steel tubing, or alternatively polymeric piping or pipelines such as polyvinyl chloride (PVC) and polyethylene (PE) piping or High Density Polyethylene (HDPE) pipelines. It will be further understood that the systems and processes depicted in the figures are merely exemplary implementations and that other arrangements of the features and steps shown in the drawings are included within the scope of the invention, including substitution, multiplication, omission, and/or reordering of the features and steps.

The table below provides the reference numerals and corresponding features of FIG. 1:

TABLE 1

| Reference Numeral | Feature |
| --- | --- |
| Tanker 1 | 120 |
| Tanker 2 | 122 |
| Produced Brine Water | 123 |
| High Viscosity Liquid Waste | 124 |
| Unload Pump 1 | 125 |
| Unload Pump 2 | 127 |
| Pipeline | 130 |
| Water Treatment and Storage | 132 |
| Screening Tank | 134 |
| Screened Liquids | 136 |
| Vibratory Screener | 138 |
| Large Dry Solids | 140 |
| Water Transfer Pump | 142 |
| Waste Fluid Transfer Pump | 144 |
| Viscosity Meter 1 | 151 |
| Mixing Valve | 153 |
| Static Mixer | 157 |
| Viscosity Meter 2 | 159 |
| Valve 1 | 162 |
| Slurry Tank | 164 |
| Charge Pump | 168 |
| Viscosity Meter 3 | 171 |
| Valve 2 | 172 |
| High Pressure Centrifugal Injection Pump | 180 |

TABLE 1-continued

| Reference Numeral | Feature |
| --- | --- |
| Permitted Injection Well | 182 |
| Off-Spec Fluids | 185 |

As shown in FIG. 1, produced brine water 123 from oil and gas wells is transported to the facility via tanker truck 120 by way of an unload pump 125 or pipeline 130 to water treatment and storage tank 132. Clean brine is stored in tankage to be used for dilution. In parallel, high viscosity liquid waste 124 is transported from tanker truck 122 by unload pump 127 to screening tank 134. The high viscosity fluids (e.g. 15 centipoise or greater) can be water- or oil-based drilling muds, produced fluids, fracking fluids, crude storage tank sludge, and the like.

In screening tank 134, high viscosity fluids 136 are passed over a vibratory screener 138 to remove all solids larger than 200 microns 140 (however, the screener can be implemented to screen solids of other sizes (e.g. 50 to 500 microns, 100 to 800 microns, and so on)). Dry solids larger than 200 microns fall from the vibratory screen into a pit or storage container. These solids 140 will be disposed of at a landfill. The liquid with solids less than 200 microns flow through the screen in the screening tank 134.

To provide mixing of the two fluids (i.e. the brine water and high viscosity liquid waste), a water transfer pump 142 transfers brine water and waste fluid transfer pump 144 transfers high viscosity fluid to mixing valve 153 and static mixer 157. The high viscosity fluids and clean brine water are mixed together at appropriate ratios to achieve the desired final viscosity of the slurry mixture. The control system for the process uses a viscosity meter 151, such as the Fork Viscosity Meter (FVM) model from Emerson (St. Louis, MO), downstream of the waste fluid transfer pump to set the ratio of waste fluid to clean brine. The mixture of the two fluids is passed through via mixing valve 153. The higher the viscosity of the waste fluid, the more clean brine is required (or less waste fluid for a given amount of clean brine). The mixture passes through an inline static mixer 157 (or the like). The viscosity is measured downstream of the static mixer by viscosity meter 159. Fluids at this point are either 'In-Spec' or 'Off-Spec'. At valve 162, in-spec fluids are sent to slurry mixing tank 164 for storage, while off-spec fluids 185 are sent back to the screening tank 134 for reprocessing.

Slurry tank(s) 164 provide onsite storage or surge volume. The slurry tanks are designed with provisions such as paddles to keep the solids in the mixture in suspension. Charge pump 168 is used to move the slurry mixture to the high pressure centrifugal injection pump(s) 180. In embodiments, a positive displacement piston pump is not used for slurry injection. A third in-line viscosity meter 171 ensures no high viscosity fluids reach the injection pumps 180. Off-spec fluids 185 (e.g., fluids that do not meet a specified viscosity threshold) at this point are sent back to the screening tank 134 by valve 172. Off-spec fluids may come from the slurry tanks 164 in the event solids are allowed to settle in the tank. The high pressure centrifugal injection pump(s) 180 provide the motive force to inject fluids into a disposal well 182 at pressure up to 5000 psi and volumes up to 20,000 barrels (bbls) per day per pump.

Further embodiments provides methods and systems for processing oil and gas drilling wastes in oil field liquid waste facilities which provides a single unload point to minimize system cost (e.g. one truck lane, one hose, one pump). The methods can include pumping a waste fluid being unloaded (i.e. entering the system) with a first pump, measuring a first pressure of the waste fluid before the waste fluid is received at the first pump, measuring a second pressure after the waste fluid is outputted by the first pump, and applying a motive force to the waste fluid with a second pump based on the measuring. The motive force can be applied by activating the second pump when the first pressure increases, the second pressure decreases, and/or the first pressure exceeds the second pressure. The second pump can be a vacuum pump and a speed of the first pump can be controlled by a variable frequency drive based on the first and second pressures.

The methods include measuring one or more property of the waste fluid such as viscosity and/or pressure and/or difference in pressure along one or more conduit transferring the waste fluid or before and/or after screening or over time, and based on the measurement(s), transferring the waste fluid to a first treatment system or a second treatment system. In embodiments, the first treatment system is a slurry treatment system and the second treatment system is an oil and/or water treatment system.

The method can further include screening the waste fluid for particulate matter during and/or prior to transfer of the waste fluid to the oil and/or water treatment system. The method can further include measuring a pressure differential before and/or after the screening of the waste fluids, and comparing the pressure differential with a predetermined value. If the pressure differential exceeds the predetermined value, then all or a portion of the waste fluid is transferred to the slurry treatment system. If the pressure differential is equal or lower to the predetermined value, then the waste fluid remains transferred to the oil and/or water treatment system.

Another embodiment provides a system for processing one or more waste fluids. The system includes a single input (e.g. hose) capable of receiving a waste fluid, such as of unknown viscosity, a first pump capable of applying a first motive force to the waste fluid received from the single input, one or more sensor capable of determining whether the first pump is priming, and a second pump capable of applying a second motive force to the waste fluid in the event the one or more sensor determine the first pump is not priming. The one or more sensor include a first pressure sensor positioned to measure the waste fluid before the waste fluid enters the first pump and a second pressure sensor positioned to measure the waste fluid after the waste fluid exits the first pump. The system is configured to activate the second pump when the first pressure increases, the second pressure decreases, and/or the first pressure exceeds the second pressure. The system can further include a variable frequency drive capable of controlling the first pump based on the pressures measured before and/or after the first pump. The second pump or motive force can be a vacuum or vacuum pump.

The system can further include a viscosity sensor capable of measuring a viscosity of the waste fluid, a first treatment system, a second treatment system, and a valve capable of directing the waste fluid to the first treatment system or the second treatment system based on a value of the viscosity sensor. In embodiments, the first treatment system is a slurry treatment system and the second treatment system is an oil and/or water treatment system. A screen capable of screening particles of a predetermined size from the waste fluid can be included, and can include a differential pressure sensor capable of measuring a difference in pressure across the screen. The valve directs the waste fluid to the first treatment system or the second treatment system based on a value of the differential pressure sensor.

No user interaction is required to determine where fluids should be sent for processing. In embodiments, the method and system utilize automated vacuum assisted pumping during the entire unload process and handle intermittent flows or flows with non-homogenous consistencies. The method and system also employ real time viscosity measurements to determine where the fluids should be directed for further processing, and automated switching without user intervention if unexpected fluid types are received from a truck.

The automated vacuum assisted pump priming is capable of handling fluids that do not easily flow from the tanker truck. Fluids are unloaded with one unload hose for all types of oil field liquid waste where the fluids are segregated downstream of the unload hose for further processing. The system and method can measure viscosity and/or differential pressure across an unload screen to detect solids or viscous fluids and to ultimately control a three-way valve or multiple valves to direct fluids to different processing systems based on viscosity.

Figure 2:
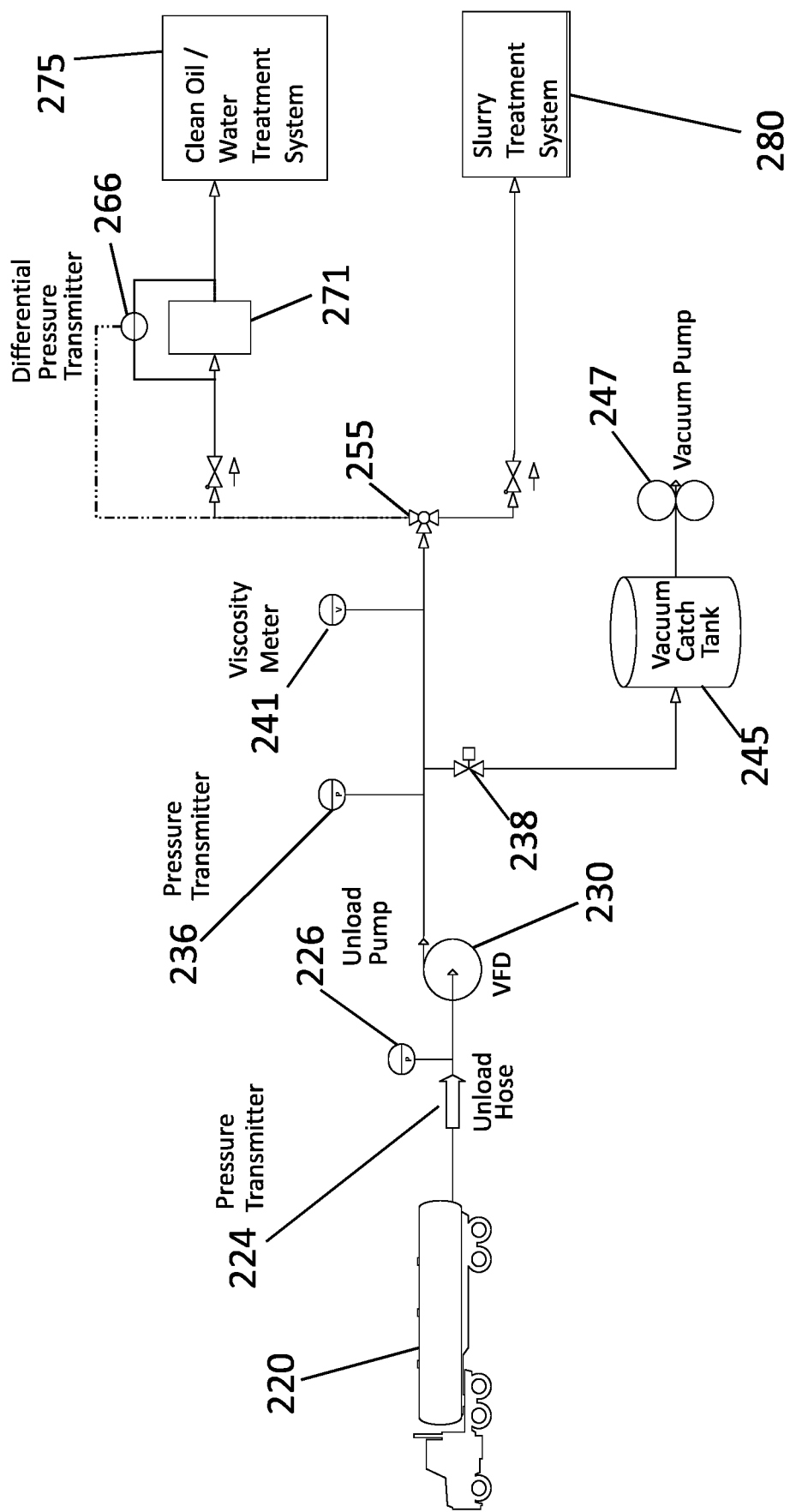
FIG. 2 is a schematic drawing depicting a system and process for unloading of waste fluids from oil fields according to an embodiment.

The following table provides the reference numerals used in FIG. 2 and the features they refer to:

TABLE 2

| Reference Numeral | Feature |
| --- | --- |
| Tanker | 220 |
| Unload Hose | 224 |
| Pressure Transmitter 1 | 226 |
| Unload Pump | 230 |
| Pressure Transmitter 2 | 236 |
| Prime Assist Valve | 238 |
| Viscosity Meter | 241 |
| Vacuum Catch Tank | 245 |
| Vacuum Pump | 247 |
| 3-way Valve | 255 |
| Differential Pressure Transmitter | 266 |
| Unload Screen | 271 |
| Clean Oil/Water Treatment System | 275 |
| Slurry Treatment System | 280 |

As shown in FIG. 2, tanker truck 220 connects an unload hose 224 to the unload system. The unload pump 230 is started. Pressures transmitters 226 and 236 monitor pressures to ensure the pump begins to prime. Priming is indicated when pressure at sensor 226 lowers and pressure at sensor 236 increases.

If the unload pump 230 does not prime (due to highly viscous fluids, blockages, flow restrictions), the prime assist valve 238 will open. Applying a vacuum to the pump discharge creates a differential pressure between the truck 220 and the pump 230 and a resultant motive force to help move the fluids to the pump suction. Vacuum pump 247 creates the vacuum in the process and catch tank 245 collects any fluids that are pulled into the vacuum lines during the priming process.

Once the pressure transmitter 236 detects an increase in pressure prime assist valve 238 is closed. The pump is primed. If the pump loses prime during the unloading process the prime assist valve 238 will open and close as necessary to decrease the time required to unload the pump.

Once the pump is primed, pressure transmitters 226 and 236 are now used to control the unload pump 230 speed to prevent cavitation and to maximize the flow rate of fluids unloaded from the truck. The speed of unload pump 230 is controlled with a variable frequency drive (VFD).

Viscosity meter 241 and 3-way valve 255 determine the viscosity of the fluid being unloaded. The viscosity meter can be an FVM series from Emerson (St. Louis, MO) or a Coriolis meter. If the fluid being unloaded is indicative of clean water and/or hydrocarbons then the valve 255 is positioned to send fluids to the clean oil/water treatment system 275. If the fluids are highly viscous or laden with solids then the valve is positioned to send fluid to the slurry treatment system 280. The system monitors the fluids in real time to ensure non-homogenous tanker truck loads are sent to the appropriate treatment system.

The 3-way valve 255 can also be controlled by differential pressure transmitter 266. The differential pressure transmitter 266 measures the pressure difference across unload screen 271. If viscous fluids and/or fluids with high solids content are sent through the unload screen 271 the differential pressure will increase as the screen begins to clog. This increase in differential pressure will trigger the three way valve 255 to redirect fluids to the slurry treatment system 280.

Embodiments of the operations and processes described or depicted herein can be implemented or assisted through one or more computer processor. Embodiments include a non-transitory computer readable storage medium which include one or more computer files including a set of computer-executable instructions for performing one or more of the processes and operations described herein and/or depicted in the drawings. In exemplary embodiments, the files are stored contiguously or non-contiguously on the computer-readable medium. Further, embodiments include a computer program product comprising the computer files, either in the form of the computer-readable medium comprising the computer files and, optionally, made available to a consumer through packaging, or alternatively made available to a consumer through electronic distribution. As used herein, a "computer-readable medium" includes any kind of computer memory such as floppy disks, conventional hard disks, CD-ROMS, Flash ROMS, non-volatile ROM, electrically erasable programmable read-only memory (EEPROM), and RAM.

As used herein, the terms "computer-executable instructions", "code", "software", "program", "application", "software code", "computer readable code", "software module", "module" and "software program" are used interchangeably to mean software instructions that are executable by a processor. The computer-executable instructions can be organized into routines, subroutines, procedures, objects, methods, functions, or any other organization of computer-executable instructions that is known or becomes known to a skilled artisan in light of this disclosure, where the computer-executable instructions are configured to direct a computer or other data processing device to perform one or more of the specified processes and operations described herein. The computer-executable instructions can be written in any suitable programming language, non-limiting examples of which include C, C++, C #, Objective C, Swift, Ruby/Ruby on Rails, Visual Basic, Java, Python, Perl, PHP, and JavaScript.

In other embodiments of the invention, files comprising the set of computer-executable instructions can be stored in computer-readable memory on a single computer or distributed across multiple computers. A skilled artisan will further appreciate, in light of this disclosure, how the invention can be implemented, in addition to software, using hardware (such as circuitry) or firmware. As such, as used herein, the operations of the invention can be implemented in a system comprising any combination of software, hardware, or firmware.

Embodiments of the invention include one or more computers or devices loaded with a set of the computer-executable instructions described herein. The computers or devices can be a general-purpose computer, a special-purpose computer, or other programmable data processing apparatus to produce a particular machine, such that the one or more computers or devices are instructed and configured to carry out the processes and operations described herein. The computer or device performing the specified processes and operations can comprise at least one processing element such as a central processing unit (i.e. processor) and a form of computer-readable memory which may include random-access memory (RAM) or read-only memory (ROM). The computer-executable instructions can be embedded in computer hardware or stored in the computer-readable memory such that the computer or device can be directed to perform one or more of the processes and operations depicted in the drawings and/or described herein.

An embodiment includes a single computer or device, such as a programable logic controller, (PLC) that is configured at an oil field liquid waste processing facility to serve as a controller. The controller can include at least one processor, a form of computer-readable memory, and a set of computer-executable instructions for performing one or more of the processes and operations described and/or depicted herein. The single computer or device can be configured at an oil field liquid waste processing facility to serve as a controller which receives input from the sensors (e.g. pressure, viscosity) and sends commands to motors controlling one or more valves to mix waste fluids or direct the flow of waste fluids in accordance with one or more processes and operations described herein. For example, motors controlling the valves can be connected to the controller by any suitable network protocol, including TCP, IP, UDP, or ICMP, as well any suitable wired or wireless network including any local area network, Internet network, telecommunications network, Wi-Fi enabled network, or Bluetooth enabled network. The controller can be configured at the oil field liquid waste processing facility to control opening and closing of the valves, the activation or speed of the pumps, and so on, based on inputs received from one or more sensors (e.g. fluid viscosity sensors, pressure sensors) installed within the facility. The controller can also allow an operator to directly control processes at the oil field liquid waste processing facility through an operator interface which can be a graphical user interface (GUI) which can be presented as an HTTP webpage that may be accessed by the operator at a remote general purpose computer with a processor, computer-readable memory, and standard I/O interfaces such as a universal serial bus (USB) port and a serial port, a disk drive, a CD-ROM drive, and/or one or more user interface devices including a display, keyboard, keypad, mouse, control panel, touch screen display, microphone, etc. for interacting with the controller through the GUI.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A system for processing one or more waste fluids, comprising:
   a first waste fluid line;
   a second waste fluid line in fluid communication with a screening tank;
   the first waste fluid line and the screening tank in fluid communication with a mixer;
   the mixer in fluid communication with a slurry tank and having an output in fluid communication with the screening tank;
   the slurry tank having an output in fluid communication with the screening tank and capable of fluid communication with an injection well;
   a first valve disposed in fluid communication with the slurry tank and capable of affecting the direction of flow from the mixer to the slurry tank or to the screening tank;
   a second valve disposed in fluid communication with the slurry tank and capable of affecting the direction of flow from the slurry tank to the injection well or to the screening tank;
   a control system programmed based on one or more properties of the mixed waste fluid i) to control the direction of flow of the mixed waste fluid and ii) to control recycling of the mixed waste fluid back to the screening tank and then to the mixer.

2. The system of claim 1, further comprising:
   a first storage tank capable of storing the first waste fluid.

3. The system of claim 1, wherein:
   the one or more properties of the mixed waste fluid comprises viscosity.

4. The system of claim 1, wherein:
   the screening tank comprises a screener capable of screening solids of a predetermined size from the second waste fluid.

5. The system of claim 1, wherein the mixer is a static mixer.

6. The system of claim 1, further comprising:
   one or more sensor capable of measuring one or more properties of the mixed waste fluid upstream and/or downstream of the slurry tank.

7. The system of claim 1, further comprising:
a pump positioned to receive the mixed waste fluid and having a motive force capable of injecting the mixed waste fluid into a disposal well.

8. The system of claim 6, wherein the mixer is a static mixer.

9. The system of claim 8, wherein the control system is further programmed to set a ratio of the first waste fluid to the second waste fluid to input into the mixer based on a property or properties of the second waste fluid.

10. The system of claim 4, wherein the screener is a vibratory screener.

11. The system of claim 10, wherein the vibratory screener is configured to remove particles larger than 200 microns from the system.

12. The system of claim 9, wherein the one or more properties of the second waste fluid comprises a pressure of the second waste fluid.

13. The system of claim 9, wherein the one or more properties of the second waste fluid comprises a difference in pressure between two pressure measurements of the second waste fluid.

14. A system for processing one or more waste fluids, comprising:
a first input capable of receiving a first waste fluid having a first viscosity;
a second input capable of receiving a second waste fluid having a second viscosity that is higher than the first viscosity;
one or more sensor capable of measuring one or more properties of the second waste fluid;
one or more mixing device capable of mixing the first waste fluid and the second waste fluid to provide a mixed waste fluid;
wherein the first and/or second inputs are configured to control input of the first waste fluid and the second waste fluid into the mixing device at a ratio of the first waste fluid to the second waste fluid based on one or more of the properties of the second waste fluid;
a slurry tank capable of storing the mixed waste fluid;
a first valve disposed in fluid communication with the slurry tank and capable of affecting the direction of flow from the mixer to the slurry tank or to a screening tank; and
a second valve disposed in fluid communication with the slurry tank and capable of affecting the direction of flow from the slurry tank to an injection well or to the screening tank.

15. A system for processing one or more waste fluids, comprising:
a first input capable of receiving a first waste fluid having a first viscosity;
a second input capable of receiving a second waste fluid having a second viscosity that is higher than the first viscosity;
one or more mixing device capable of receiving and mixing the first waste fluid and the second waste fluid to provide a mixed waste fluid;
a first sensor capable of measuring one or more properties of the second waste fluid;
a control system configured to set a ratio of the first waste fluid to the second waste fluid to input into the mixing device, by comparison of the property or properties of the second waste fluid measured by the first sensor to a predetermined value; and
a second sensor capable of measuring one or more properties of the mixed waste fluid;
wherein the control system is capable of affecting the direction of the flow of the mixed waste fluid, based on the one or more properties of the mixed waste fluid measured by the second sensor, through a first valve disposed in fluid communication with the slurry tank and capable of affecting the direction of flow from the mixer to the slurry tank or to a first screening tank; and
a second valve disposed in fluid communication with the slurry tank and capable of affecting the direction of flow from the slurry tank to an injection well or to the first screening tank and/or a second screening tank.

16. The system of claim 15, wherein the first and second sensors are viscosity sensors.

17. The system of claim 16, further comprising a slurry tank in fluid communication with the mixing device.

18. The system of claim 14, further comprising:
a first flowpath between the mixing device and the slurry tank;
wherein the first valve is in fluid communication with the first flowpath and a first recycle flowpath in fluid communication with the first screening tank and the mixer.

19. The system of claim 18, further comprising: a second flowpath downstream of the slurry tank;
wherein the second valve is in fluid communication with the second flowpath and a second recycle flowpath in fluid communication with the first and/or second screening tank and the mixer.

* * * * *